United States Patent
Asatekin et al.

(10) Patent No.: US 10,710,026 B2
(45) Date of Patent: Jul. 14, 2020

(54) ZWITTERIONIC FIBER MEMBRANES

(71) Applicant: Trustees of Tufts College, Medford, MA (US)

(72) Inventors: Ayse Asatekin, Arlington, MA (US); Peggy Cebe, Lexington, MA (US); Sefika Ozcan, Melrose, MA (US); Prity Bengani-Lutz, Somerville, MA (US)

(73) Assignee: Trustees of Tufts College, Medford, MA (US)

( * ) Notice: Subject to any disclaimer, the term of this patent is extended or adjusted under 35 U.S.C. 154(b) by 56 days.

(21) Appl. No.: 15/578,781

(22) PCT Filed: May 6, 2016

(86) PCT No.: PCT/US2016/031175
§ 371 (c)(1),
(2) Date: Dec. 1, 2017

(87) PCT Pub. No.: WO2016/195916
PCT Pub. Date: Dec. 8, 2016

(65) Prior Publication Data
US 2018/0133656 A1  May 17, 2018

Related U.S. Application Data

(60) Provisional application No. 62/169,070, filed on Jun. 1, 2015.

(51) Int. Cl.
*B01D 69/02* (2006.01)
*C02F 1/44* (2006.01)
*B01D 67/00* (2006.01)
*B01D 71/76* (2006.01)

(52) U.S. Cl.
CPC ......... *B01D 69/02* (2013.01); *B01D 67/0004* (2013.01); *B01D 71/76* (2013.01); *C02F 1/44* (2013.01); *B01D 2323/39* (2013.01); *B01D 2325/18* (2013.01)

(58) Field of Classification Search
CPC ...... B01D 69/02; B01D 69/08; B01D 69/087; B01D 67/0004; B01D 71/76; B01D 2323/39; B01D 2325/18; C02F 1/44
See application file for complete search history.

(56) References Cited

U.S. PATENT DOCUMENTS

| | | | | |
|---|---|---|---|---|
| 6,471,910 B1 * | 10/2002 | Haggard | ................ | D01D 5/253 264/555 |
| 6,753,454 B1 * | 6/2004 | Smith | ................... | A61L 15/225 602/41 |
| 7,108,787 B2 * | 9/2006 | Nakabayashi | ..... | B01D 67/0013 210/500.23 |
| 7,879,444 B2 | 2/2011 | Jiang et al. | | |
| 8,288,472 B2 * | 10/2012 | Chang | ................... | C08F 220/38 428/336 |
| 9,440,198 B2 | 9/2016 | McCloskey et al. | | |
| 2002/0037986 A1 | 3/2002 | Meier et al. | | |
| 2004/0167237 A1 | 8/2004 | Kim et al. | | |
| 2006/0148978 A1 * | 7/2006 | Reneker | .................... | C08F 2/00 524/556 |
| 2008/0000828 A1 | 1/2008 | Wechs et al. | | |
| 2012/0074064 A1 * | 3/2012 | Krause | ................. | B01D 69/088 210/646 |
| 2013/0186761 A1 | 7/2013 | Van Der Wal et al. | | |
| 2014/0116945 A1 * | 5/2014 | Kas | .................... | B01D 67/0004 210/651 |
| 2015/0328597 A1 * | 11/2015 | McCloskey | ............ | B01D 69/08 210/500.23 |
| 2016/0207007 A1 * | 7/2016 | Zhang | .................... | B01D 71/08 |
| 2016/0303523 A1 | 10/2016 | Alexiou et al. | | |

FOREIGN PATENT DOCUMENTS

WO    WO-2015070004 A1 *  5/2015 ............. B01D 71/76

OTHER PUBLICATIONS

Ahmed et al "A Review on Electrospinning for Membrane Fabrication: Challenges and Applications" Desalination vol. 356, pp. 15-30, 2015.
Brown et al "Electrospinning Zwitterion-Containing Nanoscale Acrylic Fibers" Polymer vol. 50, pp. 4781-4787, 2009.
Georgiev et al "Self-Assembly, Antipolyelectrolyte Effect, and Nonbiofouling Properties of Polyzwitterions" Biomacromolecules vol. 7, pp. 1329-1334, 2006.
Nasreen et al "Advancement in Electrospun Nanofibrous Membranes Modification and Their Application in Water Treatment" Membranes vol. 3, pp. 266-284, 2013.
Ye et al "Nonthrombogenic, Biodegradable Elastomeric Polyurethanes with Variable Sulfobetaine Content" Applied Materials and Interfaces vol. 6, pp. 22796-22806, 2014.

* cited by examiner

*Primary Examiner* — James C Goloboy
(74) *Attorney, Agent, or Firm* — Foley Hoag LLP

(57) ABSTRACT

A polymer fiber formed of statistical copolymers, each of which contains zwitterionic repeat units and hydrophobic repeat units, the zwitterionic repeat units constituting 20-75 wt % of the statistical copolymer and the hydrophobic repeat units being characterized in that a homopolymer formed thereof has a glass transition temperature above room temperature. Also disclosed is a fibrous membrane containing such polymer fibers in which greater than 90% of the polymer fibers are each independently rib bon-shaped fibers or wrinkly fibers. A method of preparing such a fibrous membrane is disclosed as well.

22 Claims, No Drawings

ZWITTERIONIC FIBER MEMBRANES

CROSS REFERENCE TO RELATED APPLICATIONS

This application is the National Stage of International Application No. PCT/US2016/031175, filed on May 6, 2016, which claims the benefit of U.S. Provisional Application No. 62/169,070, filed on Jun. 1, 2015. The contents of both applications are hereby incorporated by reference in their entirety.

BACKGROUND

Filtration membranes are widely used for water purification and wastewater treatment in food, beverage, and pharmaceutical industries.

There are three major challenges in use of filtration membranes: low permeability, fouling, and poor stability. Low permeability leads to a low flux. Fouling is loss of permeability due to adsorption and adhesion of feed components. Both low permeability and fouling result in low efficiency and high energy use. In addition, certain membranes swell and dissolve in water due to their poor stability, shortening their lifespans.

There is a need to develop high performance membranes that do not have the drawbacks mentioned above.

SUMMARY

The present invention relates to a fibrous membrane formed of polymer fibers containing zwitterionic groups. The fibrous membrane unexpectedly exhibits a high water permeance, fouling resistance, and great stability.

One aspect of this invention is a polymer fiber formed of statistical copolymers, each of which contains zwitterionic repeat units and hydrophobic repeat units. The zwitterionic repeat units constitute 20-75 wt % (e.g., 25-75 wt % and 30-70 wt %) of the statistical copolymer, and the hydrophobic repeat units are characterized in that a homopolymer formed thereof has a glass transition temperature above room temperature.

The zwitterionic repeat units each typically contain independently one or more of the following functional groups: sulfobetaine, carboxybetaine, phosphorylcholine, pyridinium alkyl sulfonate, and a combination thereof. They can be formed independently of sulfobetaine acrylate, sulfobetaine acrylamide, phosphorylcholine acrylate, phosphorylcholine acrylamide, phosphorylcholine methacrylate, carboxybetaine acrylate, carboxybetaine methacrylate, carboxybetaine acrylamide, 3-(2-vinylpyridinium-1-yl)propane-1-sulfonate, or sulfobetaine methacrylate.

Poly((methyl methacrylate)-random-(sulfobetaine methacrylate)) and poly((trifluoroethyl methacrylate)-random-(sulfobetaine methacrylate)) are two exemplary statistical copolymers.

The hydrophobic repeat units, constituting 25-80 wt % (e.g., 25-75 wt % and 30-70 wt %) of the statistical copolymer, can be formed independently of styrene, fluorinated styrene, methyl methacrylate, acrylonitrile, or trifluoroethyl methacrylate. They are capable of forming a homopolymer that has a glass transition temperature above room temperature (e.g., 25° C. or higher, 50° C. or higher, and 25-250° C.). Preferably, a homopolymer formed of the hydrophobic repeat units has a glass transition temperature above an operating temperature.

Each of the statistical copolymers generally has a molecular weight of 10,000 to 10,000,000 Daltons (e.g., 40,000 to 1,000,000 Daltons and 100,000 to 500,000 Daltons).

In one example, the polymer fiber has a diameter of 30 nm to 5 μm. In a preferred example, it has a diameter of 100 nm to 3 μm; more preferably, 100 nm to 1.5 μm; and most preferably, 200 nm to 1.5 μm.

The polymer fiber can be a ribbon-shaped fiber, a beaded fiber, or a wrinkly fiber.

Another aspect of this invention is a fibrous membrane formed from the just-described polymer fiber. The fibrous membrane can contain polymer fibers in which greater than 90% of the polymer fibers are each bead-free fibers. One example of the fibrous membrane contains polymer fibers in which greater than 90% of the polymer fibers are each independently ribbon-shaped fibers or wrinkly fibers.

The fibrous membrane also can contain a metal salt. In one example, the metal salt is a lithium salt (e.g., LiCl).

Still within the scope of this invention is a method of preparing a fibrous membrane. The method includes the following steps: (i) providing a copolymer solution of a statistical copolymer containing zwitterionic repeat units and hydrophobic repeat units, (ii) electrospinning the copolymer solution to form polymer fibers, and (iii) depositing the polymer fibers onto a collector plate to form a fibrous membrane.

The copolymer solution is typically prepared in an organic solvent, such as N,N-dimethylacetamide, 2,2,2-trifluoroethanol, and a mixture of 2,2,2-trifluoroethanol and N,N-dimethylformamide.

An exemplary copolymer solution contains a metal salt, such as a lithium salt (e.g., LiCl).

Also within the scope of this invention is a fibrous membrane prepared by the method described above. Preferably, the fibrous membrane thus prepared contains polymer fibers each having a diameter of 30 nm to 5 μm.

The details of the invention are set forth in the description below. Other features, objects, and advantages of the invention will be apparent from the following detailed description of several embodiments, and also from the appending claims.

DETAILED DESCRIPTION

Disclosed herein is a method of producing a fibrous membrane by electrospinning copolymers, which contain hydrophobic repeat units and zwitterionic repeat units, to form polymer fibers.

Typically, the fibrous membrane is prepared following the procedure set forth below.

A statistical copolymer containing zwitterionic repeat units and hydrophobic repeat units is synthesized using methods well known in polymer science (e.g., free radical polymerization). A copolymer solution is formed by dissolving the statistical copolymer in an organic solvent (e.g., N,N-dimethylacetamide, 2,2,2-trifluoroethanol, or a mixture of 2,2,2-trifluoroethanol and N,N-dimethylformamide). The copolymer solution thus prepared is converted into polymer fibers by electrospinning the solution with certain electrical voltages. The polymer fibers are then deposited onto a collector plate to generate a fibrous membrane.

The statistical copolymer, which contains zwitterionic repeat units and hydrophobic repeat units, incorporates these two types of repeat units in a random order (as opposed to blocks). It generally has a molecular weight of 10,000 to 10,000,000 Daltons; preferably, above 20,000 Daltons; more preferably, above 40,000 Daltons; and even more preferably, above 100,000 Daltons.

Electrospinning a copolymer solution of the statistical copolymer produces continuous polymer fibers that have diameters of a scale from nanometer to micrometer. Nano- to micron-scale polymer fibers are generated by imposing an external electric field on the copolymer solution. Electrospinning parameters and copolymer solution features can be manipulated to achieve desired fiber morphology and fiber size. Important electrospinning parameters include electrical voltage, distance between the syringe needle and the collector plate, inner diameter of the syringe needle, humidity within the electrospinning chamber, gas flow rate within the electrospinning chamber, and geometry and rotating speed of the collector plate. Important copolymer solution features include copolymer concentration, solvent composition, salt concentration, and flow rate of the solution.

Morphologically, the polymer fibers can be ribbon-shaped fibers, beaded fibers, bead-free fibers, or wrinkly fibers. In one example, the polymer fibers demonstrate the morphology of cylindrical nanofibers having a diameter less than 300 nm. In another example, the polymer fibers exhibit the morphology of cylindrical microfibers having a diameter less than 3 μm.

Polymer fibers thus produced are deposited onto a collector plate, which can be a flat collector or a rotatable drum collector, and form a non-woven mat of fibers. When using a rotatable drum collector, drum rotation results in an additional mechanical stretching force associated with the fibrous membrane thus prepared. This process generates various highly porous membranes formed of polymer fibers, depending on electrospinning conditions, copolymer compositions, and solvent and additive choices. One example of the fibrous membrane is formed of nanofibers with specific morphology, in which the polymer fibers are mostly, e.g., >90%, ribbon-shaped fibers having non-circular, flattened cross-sections.

Also disclosed herein is a fibrous membrane prepared by the method described above.

The fibrous membrane is formed of polymer fibers containing a statistical copolymer, which encompasses two types of repeat units, namely, zwitterionic repeat units and hydrophobic repeat units. The zwitterionic repeat units impart fouling resistance, whereas the hydrophobic repeat units prevent dissolution of the polymer fibers and, thus, the fibrous membrane, in a liquid.

The hydrophobic repeat units can further be used to increase hydrophobicity of the membrane, which is useful in specific applications. Certain hydrophobic repeat units are characterized in that a homopolymer formed thereof has a glass transition temperature above an operating temperature when the operating temperature is higher than room temperature. This type of hydrophobic repeat units can prevent swelling of zwitterionic domains, leading to a more stable fibrous membrane in a liquid.

It is unexpected that surfaces of the above-described fibrous membrane, which resists fouling, exhibit a sessile drop water contact angle above 90° C. (e.g., 134° C.), which indicates that the surfaces are hydrophobic. Unlike a typical fouling resistant membrane, which has highly hydrophilic surfaces, the fibrous membrane unexpectedly is both hydrophobic and fouling resistant.

It is also unexpected that the fibrous membrane of this invention exhibits a high water permeance up to 1374±11 $Lm^{-2}h^{-1}bar^{-1}$.

The fibrous membrane of this invention can be used in various applications including fluid filtration (e.g., water filtration and air filtration), water purification and desalination, and wastewater treatment.

Without further elaboration, it is believed that one skilled in the art can, based on the above description, utilize the present invention to its fullest extent. The following specific examples are, therefore, to be construed as merely illustrative, and not limitative of the remainder of the disclosure in any way whatsoever.

Example 1: Preparation of a Statistical Copolymer Poly(Trifluoroethyl Methacrylate-Random-Sulfobetaine Methacrylate) (PTFEMA-r-SBMA)

In this example, a random copolymer with poly(trifluoro ethyl methacrylate) (PTFEMA) backbone and zwitterionic side-groups, used in the preparation of certain membranes of the invention, was synthesized as follows.

2,2,2-Trifluoroethyl methacrylate (TFEMA, Aldrich) and sulfobetaine methacrylate (SBMA, Aldrich) were passed through a column of basic activated alumina (VWR) to remove inhibitors therein. SBMA (2 g) was dissolved in dimethyl sulfoxide (DMSO, 100 ml) in a round bottom flask while stirring at 350 rpm. TFEMA (8 g) and azobisisobutyronitrile (AIBN, Aldrich; 0.0125 g) were added into the round bottom flask. TFEMA:SBMA in a ratio of 80:20 wt:wt were added to the flask. The flask was sealed with a rubber septum. Nitrogen was bubbled through the mixture thus prepared for 20 minutes to purge any dissolved oxygen. The flask was then kept at 70° C. while stirring at 350 rpm for at least 48 hours. 0.5 g of 4-methoxyphenol (MEHQ) was added thereafter to terminate the reaction. The reaction mixture was first precipitated in water. The polymer clumped at the bottom of the flask was collected and purified by stirring it in two fresh portions of ethanol:hexane mixture (1:1 v:v) overnight, followed by drying under vacuum overnight. The composition of the white polymer was calculated from a $^1$H-NMR spectrum, using the ratio of the total backbone protons (0.5-2 ppm) to the protons of SBMA (2-3.5 ppm).

The copolymer was determined to contain 20 wt % SBMA.

Example 2: Electrospinning of PTFEMA-r-SBMA in N,N-Dimethylacetamide (DMAc)

In this example, electrospinning of a copolymer solution of the copolymer described in Example 1 in DMAc was studied as follows.

The copolymer solution was prepared by adding 0.18 g of the copolymer to 1 mL of DMAc, and stirring the solution at room temperature overnight.

A glass syringe (14.4 mm inner diameter) and a 16 gauge stainless steel needle were used and locked onto a syringe pump (Braintree Scientific, Inc. BS-8000), loaded with about 10 mL of solution. A rotatable flat plate collector was used as the counter electrode. The rotatable flat plate was covered by grounded aluminum foil. High voltage power supply (Gamma High Voltage Research Inc. Model No. ES30P-5 w) was used to charge the solution, providing an applied voltage of 12 to 25 kV for this study.

ES fibers were kept under vacuum until the day of analysis. The non-woven membranes thus formed were characterized by Scanning Electron Microscopy (SEM) using a Phenom Pure G2 Tabletop SEM instrument. The samples were sputter coated with gold/palladium to prevent charging. In order to prevent charging, a charge-up reduction stage accessory was used. For electrospinning this copolymer in DMAc, different feeding rates (0.01 ml/min to 0.1 ml/min), various distance between tip of the needle and the collector (10 cm-20 cm), and different voltages (12 kV-25 kv) were examined.

Unexpectedly, electrospraying to form continuous polymer fibers was observed in all studies.

Example 3: Electrospinning of PTFEMA-r-SBMA in a Mixture of Trifluoroethanol (TFE) and N,N-Dimethylformamide (DMF)

In this example, electrospun non-woven materials were prepared from the copolymer described in Example 1 from its solutions in a mixture of TFE and DMF. Several polymer solutions were prepared at different concentrations, as listed in Table 1 below, in which polymer solvent mixtures were stirred at room temperature until the polymer was fully dissolved.

TABLE 1

Polymer solutions used for electrospinning

| Polymer solution code | PTFEMA-r-SBMA mass (g) | TFE volume (mL) | DMF volume (mL) |
|---|---|---|---|
| P18-2:1-0 | 0.18 | 0.666 mL | 0.333 mL |
| P18-3:1-0 | 0.18 | 0.750 mL | 0.250 mL |
| P24-3:1-0 | 0.24 | 0.750 mL | 0.250 mL |
| P27-3:1-0 | 0.27 | 0.750 mL | 0.250 mL |

Electrospinning was performed using the apparatus described in Example 2. Electrospun mats were successfully obtained at 22.5 kV applied voltage and 18 cm working distance between need and collector plate. Beaded fibers were obtained from the P18-2:1-0 and P18-3:1-0 solutions. As the ratio of TFE (a more volatile solvent that solvates the copolymer better) to DMF increased from 2:1 to 3:1, the amount of beads decreased, as observed by scanning electron microscopy (SEM).

When a 3:1 TFE:DMF ratio was used and the copolymer concentration was increased, bead-free fibers were successfully obtained. Furthermore, as polymer concentration increased, so did the fiber diameter. Non-wovens prepared from P18-3:1-0 had an average diameter of ~200 nm. The average diameter unexpectedly increased to ~750 nm for P24-3:1-0, and ~1000 nm for P27-3:1-0.

Upon inspection at higher magnification, fibers prepared from P27-3:1-0 were found to have rough, wrinkled surfaces. SEM images of electrospun fibers prepared from P27-3:1-0 showed wrinkly fibers.

For the same polymer solution and feed rate, it was shown that, as long as electrospinning was achieved, the distance and the voltage applied had relatively minimal influence on the resultant fiber diameter.

Example 4: Electrospinning of PTFEMA-r-SBMA from a Mixture of Trifluoroethanol (TFE) and N,N-Dimethylformamide (DMF) with LiCl Addition In this example, impact of salts adding to polymer solution was assessed on how electrospun fibers form as follows.

Electrospun membranes were prepared from solutions of the copolymer described in Example 1 with varying amounts of LiCl in a 3:1 mixture of TFE:DMF. The polymer solution compositions are listed in Table 2 below. Note that P18-3:1-0 in Table 1 is the same as P18-0 in Table 2, as the solvent composition is same for the data set in Table 2. Similarly, P27-0 in Table 2 is the same as P27-3:1-0 in Table 1. All mats were prepared at a working distance of 18 cm and an applied voltage of 22.5 kV. Solutions of P27-1.5 and P27-1 were electrospun at a rotatable drum at 2500 rpm to obtain a uniform fiber mat.

TABLE 2

Polymer solutions with and without LiCl used for electrospinning

| Polymer solution code | PTFEMA-r-SBMA mass (g) | LiCl mass (g) | TFE volume (mL) | DMF volume (mL) | Collector Type |
|---|---|---|---|---|---|
| P18-0 | 0.18 | 0 | 0.750 | 0.250 | Stationary |
| P18-0.5 | 0.18 | 0.05 | 0.750 | 0.250 | Stationary |
| P18-1 | 0.18 | 0.1 | 0.750 | 0.250 | Stationary |
| P18-1.5 | 0.18 | 0.15 | 0.750 | 0.250 | Stationary |
| P27-0 | 0.27 | 0 | 0.750 | 0.250 | Stationary |
| P27-0.5 | 0.27 | 0.05 | 0.750 | 0.250 | Stationary |
| P27-1 | 0.27 | 0.1 | 0.750 | 0.250 | Rotatable drum |
| P27-1.5 | 0.27 | 0.15 | 0.750 | 0.250 | Rotatable drum |

It was unexpectedly observed that, as salt concentration increased, bead-free fibers were obtained even at lower polymer concentrations. In order to obtain bead free fibers from salt-free solutions, the polymer concentration had to be increased (e.g., P27-0). Micron-size fibers were obtained at this concentration. In addition, at a higher polymer concentration and a higher salt concentration (e.g. P27-1.5), ribbon-shaped fibers were unexpectedly obtained.

Example 5: Water Contact Angle of Electrospun Membranes

In this example, a sessile drop contact angle was assessed on electrospun membranes prepared in Example 4 and labeled as P18-0 as follows.

A piece of aluminum foil fully covered with nanofibers, which were prepared by electrospinning a P18-0 solution, was placed onto the stage of the contact angle instrument. 0.2 microliter of a drop gently put on the surface. DropImage instrument software was used to measure the contact angle. Mean of right-angles were reported for each locations. Six measurements at two different locations were averaged.

The contact angle was found to be 134±3°, indicating the membranes were highly hydrophobic.

Example 6: Water Permeability of Electrospun Membranes

In this example, pure water fluxes through the P18-0 and P27-0 membranes described in Example 4 were measured as follows.

The study used an Amicon 8010 stirred, dead-end filtration cell (Millipore) with a cell volume of 10 mL and an effective filtration area of 4.1 cm$^2$. The cell was stirred at 500 rpm. This study was performed at 5 psi for P18-0 and 2 psi for P27-0. The flow rate was measured by recording permeate weights using a balance connected to a computer. Permeance was calculated after the flux was stabilized. The value thus obtained was divided by filtration area and experiment time to obtain water flux. The flux value was normalized by pressure to obtain pure water permeance.

The pure water permeance of the P18-0 membrane was unexpectedly found to be 634±5 L/m²·h·bar, whereas that of P27-0 was even more unexpectedly found to be as high as 1374±11 L/m²·h·bar.

Example 7: Electrospinning of PTFEMA-r-SBMA from Trifluoroethanol (TFE)

In this example, electrospun non-woven membranes were prepared from the copolymer described in Example 1 from its solutions in TFE. 0.18 g of the copolymer was weighed into a clean vial. 1 mL of TFE was added. The vial was sealed and stirred overnight at room temperature. The polymer solution was then placed in a glass syringe with a 16 gauge metal needle and electrospun using the instrument described in Example 2. The working distance was 18 cm and the applied voltage was 22.5 kV.

Electrospraying was unexpectedly observed to produce continuous polymer fibers.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Further, from the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

The invention claimed is:

1. A polymer fiber, comprising a plurality of statistical copolymers, wherein each statistical copolymer comprises a plurality of zwitterionic repeat units and a plurality of hydrophobic repeat units, wherein
the zwitterionic repeat units constitute 20-75 wt % of the statistical copolymer;
the hydrophobic repeat units are characterized in that a homopolymer formed thereof has a glass transition temperature above room temperature;
each of the zwitterionic repeat units independently comprises sulfobetaine, carboxybetaine, phosphorylcholine, or pyridinium alkyl sulfonate;
each of the hydrophobic repeat units independently is formed of styrene, fluorinated styrene, methyl methacrylate, acrylonitrile, or trifluoroethyl methacrylate; and
the polymer fiber is uniformly made from the statistical copolymer.

2. The polymer fiber of claim 1, wherein the polymer fiber has a diameter of 30 nm to 5 μm.

3. The polymer fiber of claim 2, wherein the polymer fiber has a diameter of 200 nm to 1.5 μm.

4. The polymer fiber of claim 1, wherein each statistical copolymer has a molecular weight of 10,000 to 10,000,000 Daltons.

5. The polymer fiber of claim 4, wherein each statistical copolymer has a molecular weight of 100,000 Daltons to 10,000,000 Daltons.

6. The polymer fiber of claim 1, wherein each of the zwitterionic repeat units independently is formed from sulfobetaine acrylate, sulfobetaine acrylamide, phosphorylcholine acrylate, phosphorylcholine acrylamide, phosphorylcholine methacrylate, carboxybetaine acrylate, carboxybetaine methacrylate, carboxybetaine acrylamide, 3-(2-vinylpyridinium-1-yl)propane-1-sulfonate, or sulfobetaine methacrylate; and each of the hydrophobic repeat units independently is formed from methyl methacrylate, acrylonitrile, or trifluoroethyl methacrylate.

7. The polymer fiber of claim 1, wherein the statistical copolymer is poly((methyl methacrylate)-random-(sulfobetaine methacrylate)) or poly((trifluoroethyl methacrylate)-random-(sulfobetaine methacrylate)).

8. The polymer fiber of claim 1, wherein the polymer fiber is a ribbon-shaped fiber, a beaded fiber, or a wrinkly fiber.

9. A fibrous membrane, comprising a plurality of the polymer fibers of claim 1, wherein greater than 90% of the polymer fibers are ribbon-shaped fibers or wrinkly fibers.

10. The fibrous membrane of claim 9, wherein the fibrous membrane further comprises a metal salt.

11. The fibrous membrane of claim 10, wherein the metal salt is a lithium salt.

12. A method of preparing a fibrous membrane, comprising:
providing a solution of a statistical copolymer comprising a plurality of zwitterionic repeat units and a plurality of hydrophobic repeat units;
electrospinning the copolymer solution to form polymer fibers; and
depositing the polymer fibers onto a collector plate to form a fibrous membrane;
wherein
the zwitterionic repeat units constitute 20-75 wt % of the statistical copolymer;
the hydrophobic repeat units are characterized in that a homopolymer formed thereof has a glass transition temperature above room temperature;
each of the zwitterionic repeat units independently comprises sulfobetaine, carboxybetaine, phosphorylcholine, or pyridinium alkyl sulfonate;
each of the hydrophobic repeat units independently is formed of styrene, fluorinated styrene, methyl methacrylate, acrylonitrile, or trifluoroethyl methacrylate; and
each polymer fiber is uniformly made from the statistical copolymer.

13. The method of claim 12, wherein the solution is prepared in an organic solvent.

14. The method of claim 13, wherein the organic solvent is N,N-dimethylacetamide, 2,2,2-trifluoroethanol, or a mixture of 2,2,2-trifluoroethanol and N,N-dimethylformamide.

15. The method of claim 13, wherein the solution comprises a metal salt.

16. The method of claim 14, wherein the metal salt is a lithium salt.

17. The method of claim 12, wherein each of the zwitterionic repeat units independently is formed from sulfobetaine acrylate, sulfobetaine acrylamide, phosphorylcholine acrylate, phosphorylcholine acrylamide, phosphorylcholine methacrylate, carboxybetaine acrylate, carboxybetaine methacrylate, carboxybetaine acrylamide, 3-(2-vinylpyridinium-1-yl)propane-1-sulfonate, or sulfobetaine methacrylate; and each of the hydrophobic repeat units independently is formed from methyl methacrylate, acrylonitrile, or trifluoroethyl methacrylate.

18. The method of claim 12, wherein the polymer fibers have diameters of 30 nm to 5 μm.

19. The method of claim 12, wherein the collector plate is a flat collector or a rotatable drum collector.

20. A fibrous membrane prepared by the method of claim 12, wherein the polymer fibers have diameters of 30 nm to 5 μm.

21. The fibrous membrane of claim 20, wherein greater than 90% of the polymer fibers are bead-free fibers.

22. The fibrous membrane of claim 21, wherein greater than 90% of the polymer fibers are independently ribbon-shaped fibers or wrinkly fibers.

* * * * *